(12) United States Patent
Adachi et al.

(10) Patent No.: US 7,905,646 B2
(45) Date of Patent: Mar. 15, 2011

(54) LIGHTING UNIT AND DISPLAY EQUIPMENT PROVIDED THEREWITH

(75) Inventors: Masaya Adachi, Hitachi (JP); Tatsuya Sugita, Takahagi (JP)

(73) Assignee: Hitachi Displays, Ltd., Chiba (JP)

( * ) Notice: Subject to any disclaimer, the term of this patent is extended or adjusted under 35 U.S.C. 154(b) by 371 days.

(21) Appl. No.: 11/969,931

(22) Filed: Jan. 7, 2008

(65) Prior Publication Data
US 2008/0165307 A1 Jul. 10, 2008

(30) Foreign Application Priority Data

Jan. 9, 2007 (JP) ................... 2007-001414

(51) Int. Cl.
*F21V 8/00* (2006.01)
(52) U.S. Cl. ........ 362/601; 362/610; 362/613; 362/616; 362/623
(58) Field of Classification Search .................. 362/601, 362/610, 612, 613, 615, 616, 623, 223, 218, 362/580, 561; 349/62, 61, 65
See application file for complete search history.

(56) References Cited

U.S. PATENT DOCUMENTS

| | | | | |
|---|---|---|---|---|
| 3,681,592 | A * | 8/1972 | Hugelshofer | ................. 362/580 |
| 4,542,449 | A | 9/1985 | Whitehead | |
| 6,989,873 | B2 * | 1/2006 | Hua-Nan et al. | ................. 349/64 |
| 7,168,842 | B2 * | 1/2007 | Chou et al. | .................... 362/631 |
| 2004/0124764 | A1 | 7/2004 | Suzuki et al. | |
| 2006/0091406 | A1 | 5/2006 | Kaneko et al. | |
| 2007/0279931 | A1 * | 12/2007 | Bryan et al. | .................. 362/600 |

FOREIGN PATENT DOCUMENTS

| | | |
|---|---|---|
| JP | 1-37801 | 8/1989 |
| JP | 2003-27246 | 1/2003 |
| JP | 2004-146268 | 5/2004 |
| JP | 2004-171948 | 6/2004 |
| JP | 2001-184924 | 7/2004 |
| JP | 2005-078824 | 3/2005 |
| JP | 2006-4877 | 1/2006 |

OTHER PUBLICATIONS

Nicola Pfeffer, et al., New Direction Selective Light Extraction Light Pipe for LCD Backlighting With LEDs, Proc, IDW'02, pp. 505-508.

* cited by examiner

*Primary Examiner* — Sharon E Payne
(74) *Attorney, Agent, or Firm* — Antonelli, Terry, Stout & Kraus, LLP.

(57) ABSTRACT

A light-guiding member is provided with two light source groups on its both terminals and the light-guiding board comprises two light mixing areas which have a cross section form which is symmetry for its center line, and a light outputting area between these. The light mixing areas function as an area in which the lights from each adjacent light source group are mixed and at the same time function as an area to output the mixed lights from each remote light source group. The light outputting area functions as an area to pass a part of the mixed lights from the two light source groups and at the same time functions as an area to output the rest.

17 Claims, 6 Drawing Sheets

LIGHTING UNIT AND DISPLAY EQUIPMENT PROVIDED THEREWITH

BACKGROUND OF THE INVENTION

The present invention relates to a lighting unit of display equipment which displays an image by adjusting the transmitted light intensity of the light, and in particular, to a lighting unit which uses a light source which has a plurality of different light emitting colors and display equipment provided therewith.

The display equipment is a medium which visually conveys the information to the human, and in the present day which has become a highly information society it is an important existence for the human and the society. The display equipment can be roughly classified in display equipment of emissive type such as CRT (Cathode Ray Tube), PDP (Plasma Display Panel) and the like, and display equipment of non-emissive type such as liquid crystal display equipment, ECD (Electrochromic Display), EPID (Electrophoretic Image Display), and the like.

The display equipment of non-emissive type is the one which displays the image by adjusting the transmitted (or reflection) light intensity of the light, and among these, in particular, the liquid crystal display equipment has recently been improved greatly in its performance and has been adopted greatly as display equipment for from the cellular phone to the personal computer, further for the large screen television and the like.

The liquid crystal display equipment is generally configured with a liquid crystal display panel which forms the image by controlling the transmitted light intensity or the reflection light intensity of the light and a lighting unit which is arranged on the rear of the liquid crystal display panel and illuminates the light to the liquid crystal display panel.

For the lighting unit there are an edge light type (a light-guiding member type), a direct type (a reflector type), and a planate light source type, and in particular, when realizing a lighting unit of thin type, the edge light type is used. The edge light type arranges the light source in the terminal part of the light-guiding member and conventionally the cold-cathode tube has mainly been used as a light source. However, recently, in the small size liquid crystal display equipment such as a cellular phone, the light emitting diode (LED) is used as a light source of the lighting unit. Further, LED which is a mercury-less light source has been adopted more and more also for the large size liquid crystal display equipment because it does not need an inverter which is necessary for the cold-cathode tube and from the point of view of the reduction of the environmental burden.

Also, when LED is used as a light source, when LED which emits the primary color lights such as red, green and blue is used as a light source, there is an advantage that it can realize display equipment which has high color purity and wide color gamut. In this way, when a plurality of LEDs which have different light emitting colors are used, in order to mix the lights of each color and make it an uniform white light, a color mixing area is provided in a part of the light-guiding member. As this color mixing area becomes an ineffective area from which the illumination light is not outputted, it becomes an obstacle to make the lighting unit small.

As a method to reduce this ineffective area, a lighting unit is described in Nicola et al., "New direction selective light extraction light pipe for LCD backlighting with LEDs", Proc. IDW'02, p 505-508, 2002 or in JP-A-2006-4877, which in a lighting unit which has a wedge-type light-guiding member and a light source, among the facing surfaces which have different thickness of the light-guiding member, the light source is arranged on the terminal surface of the side of small thickness (thin) and a reflector is provided on the terminal surface of the side of large thickness (thick).

In this case, a plurality of light emitting colors are outputted from the different light sources and the lights which enter in the light-guiding member reach to the reflector without being outputted from the light-guiding member mixing the lights of each color. The light which is reflected at the reflector is light guided within the light-guiding member again, but this time it is reflected at the reverse side of the light-guiding member and is outputted to the obverse side. On this occasion, the lights outputted from the plurality of light sources are mixed and a uniform outputted light is obtained.

Namely, in the lighting unit described in Nicola et al., "New direction selective light extraction light pipe for LCD backlighting with LEDs", Proc. IDW'02, p 505-508, 2002 or in JP-A-2006-4877, in the light-guiding member, an area where the lights of a plurality of different colors are mixed and an area to output the light are used for both purposes. Therefore, it is disclosed that a lighting unit which can obtain the light of uniform mixed color and has a small ineffective area can be realized.

In the lighting unit of edge light type, the thickness of the light-guiding member on the light source side is made to be thicker than that of the light source in order to improve the efficiency when the light outputted from the light source enters in the light-guiding member. Therefore, in the typical lighting unit of edge light type, the thickness of the light-guiding member becomes the thickest on the light source side.

On the other hand, in the above-mentioned background technique, there is a problem that the thickness of the light-guiding member becomes thicker than that of the light-guiding member used for the typical edge light type because it is necessary to make it thicker on the reflector side than on the light source side. Further, as the light source is to be arranged on one terminal surface of the light-guiding member, the number of the light sources which can be arranged is limited. For this reason, it has a problem that it is difficult to obtain a lighting unit which has the light intensity necessary for realizing light display equipment. These problems become notable in particular in a lighting unit for a large screen.

SUMMARY OF THE INVENTION

The present invention has been invented to solve such problems of the background technique and its object is to realize a lighting unit comprising a light source which emits a plurality of different colors which has small ineffective area for mixing the lights of each color and is of thin type and bright, and display equipment provided therewith.

The present invention is a lighting unit comprising a first light source group and a second light source group which are arranged adjacently to terminal surfaces of a light-guiding member, wherein area of the light-guiding member is divided into a first light mixing area, a light outputting area, and a second light mixing area, and in the first light mixing area and the second light mixing area lights from an adjacent light source group are mixed being hardly outputted and a mixed light from a remote light source group is outputted, also, in the light outputting area a part of the mixed light is transmitted and the rest of the mixed light is outputted.

Also, the present invention is a lighting unit comprising a first light source group and a second light source group which are arranged adjacently to terminal surfaces of a light-guiding member, wherein a form of both terminal parts of the light-guiding member is tapered shape and a form of a central part of the light-guiding member is flat plane.

Further, the present invention is display equipment which uses said lighting unit as a back light, the long side direction of a display panel and an arrangement direction (a longitudinal direction) of the light source groups are matched.

In the above, according to the present invention, in a lighting unit which uses a light source which is provided with a plurality of light emitting devices, a lighting unit which has high uniformity of illumination light and a narrow frame and is of thin type can be realized. Therefore, the display equipment which uses the lighting unit of the present invention can realize display equipment which has high uniformity of brightness and color of the screen and has a narrow frame and is of thin type.

Other objects, features and advantages of the invention will become apparent from the following description of the embodiments of the invention taken in conjunction with the accompanying drawings.

DESCRIPTION OF THE INVENTION

It will be explained about embodiments of the present invention in detail below, but various changes are possible and the combinations of the embodiments themselves should be construed to be included in the present invention.

Embodiment 1

Figure 1:
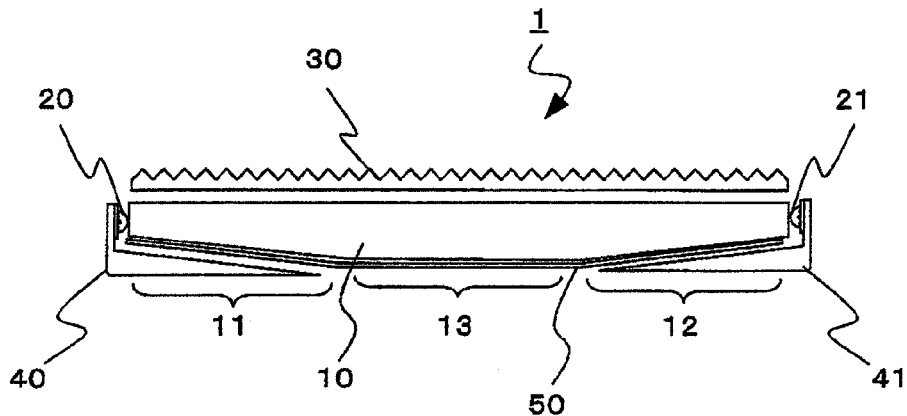
FIG. 1 is a partial cross section showing a schematic configuration of a main part of a lighting unit according to the present invention.

FIG. 1 shows an example of a lighting unit according to the present invention and is a partial cross section showing a schematic configuration of a main part. And, FIG. 2 is a schematic cross-eyed diagram showing the configuration of the main part of the lighting unit according to the present invention.

Figure 2:
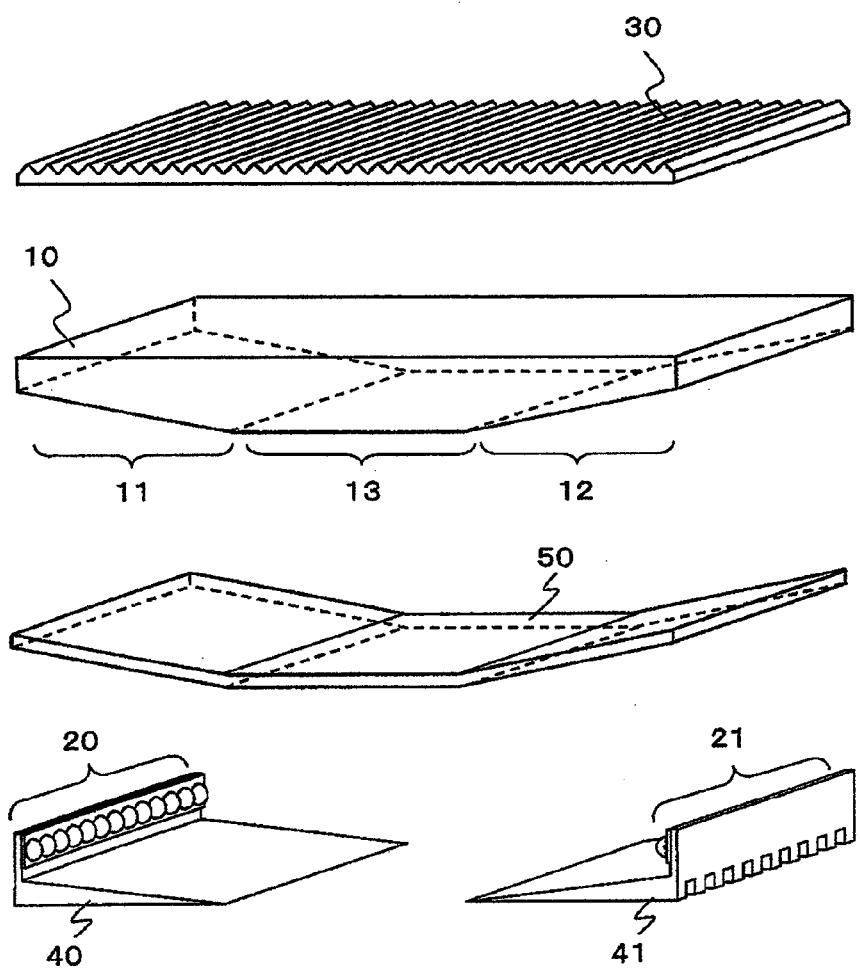
FIG. 2 is a breakdown cross-eyed diagram of the lighting unit shown in FIG. 1.

In FIGS. 1 and 2, a lighting unit 1 is arranged on the rear of a display panel not shown which displays the image by adjusting the transmitted light intensity of the light and it is appropriate for the lighting unit which illuminates the display panel from the rear. For the display panel, a display panel which displays the image by adjusting the transmitted light intensity of the light which enters can be used, and in particular, a liquid crystal display panel which has a long lifetime and can conducts a matrix display can be used.

The lighting unit 1 is configured with a light-guiding member 10, a first light source group 20 and a second light source group 21 which are configured with a plurality of light emitting devices arranged in the vicinity of two terminal surfaces which face each other of the light-guiding member 10 respectively, a light reflector 50 provided on the reverse side of the light-guiding member 10, and a light control element 30 arranged on the obverse side of the light-guiding member 10 to cover its surface allover. Here, in order to configure the lighting unit, a mechanical configuration such as a frame and the like, and an electrical configuration such as a power source and wire and the like which are necessary to make the light source emit the light are necessary, but regarding the part which is not the feature of the present invention, a detailed explanation will be omitted because a common method may be used.

For the first light source group 20 and the second light source group 21, it is preferable to use a light emitting device which satisfies the conditions such as a small size, high luminous efficiency, and low heat emission as a plurality of light emitting devices which configure these light source groups, and as such a light emitting device LED (Light Emitting Diodes) is appropriate. As a light emitting device, LED which emits a white color light can be used. As LED which realizes the light emission of the white color, LED which realizes the white color light emission by combining the blue color light emission and the fluorescent substance which is excited by this blue color light and emits the light of yellow color, or LED which realizes the white color light emission which has the emission peak wavelength at the blue, green, and red colors by combining the light emission of the blue color or the ultraviolet light and the fluorescent substance which is excited by this emitted light and emits the light can be used.

Or, when the display equipment provided with this lighting unit realizes the color display by the additive color mixing, it is preferable to use LED which emits the three primary colors of red, blue, and green may be used as a light emitting device. For example, when a color liquid crystal panel is used as a display panel, display equipment which has a wide color reproduction range can be realized by using a light source which has the emission peak wavelength corresponding to the transmitted spectrum of the color filter of the liquid crystal display panel. Or, when the color display is realized by the color field sequential, as the color filter which is a cause of the light loss is not necessary for the liquid crystal display panel, display equipment which has a small light loss and a wide color reproduction range can be realized by using LED which emits the three primary colors of red, blue, and green.

Figure 3:
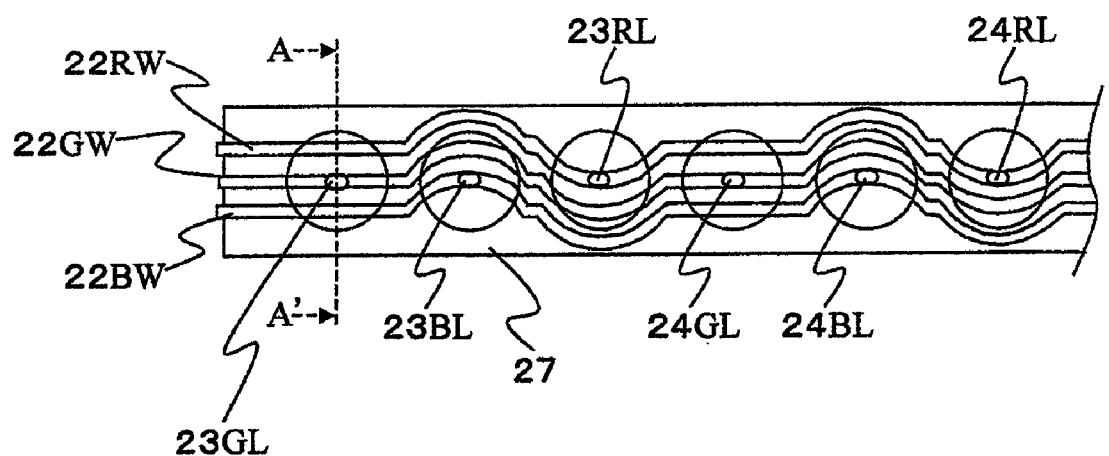
FIG. 3 is a plane diagram showing an example of a light source group shown in FIG. 1.

FIG. 3 is a plane diagram showing an example of the light source group in the present invention, and as a light emitting device, a plurality of LEDs which emit the light in red, blue, and green colors respectively are arranged in a line. Also, FIG. 4 is a schematic cross section at A-A' in FIG. 3.

In FIG. 3, the light source group includes green light emitting devices 23GL, 24GL, blue light emitting devices 23BL, 24BL, and red light emitting devices 23RL, 24RL which consist of LED, and, a green wire 22GW connected to the green light emitting device, a blue wire 22BW connected to the blue light emitting device, and a red wire 22RW connected to the red light emitting device. These light emitting devices and wires are formed on an insulation layer 27. Here, the number of the light emitting devices is not limited to the number shown.

Here, it is preferable that the plurality of light emitting devices should be arranged in a certain width, namely, they are arranged so that they are accommodated within the height of the terminal surface of the adjacent light-guiding member 10. Thereby, it is possible to make the light outputted from the light emitting device enter in the light-guiding member efficiently and make the thickness of the lighting unit minimum. Therefore, it is preferable to configure so that the light emitting devices of each color are arranged substantially in one line by bending the wires as shown in FIG. 3. Here, when the area of the lighting object is large or a large amount of light intensity is needed, it occurs that the number of the light emitting devices which can be arranged in one line is not sufficient. In this case, the light emitting devices may be arranged in a belt by arranging them in more than one line. In either case, it is preferable to arrange the light emitting devices in a certain width, namely, to arrange them in one line or in a belt so that they are accommodated within the height of the terminal surface of the adjacent light-guiding member 10. Each light emitting device is connected to a direct current power source not shown and to a control unit which controls the turning on and off of the light through the wire.

Figure 4:
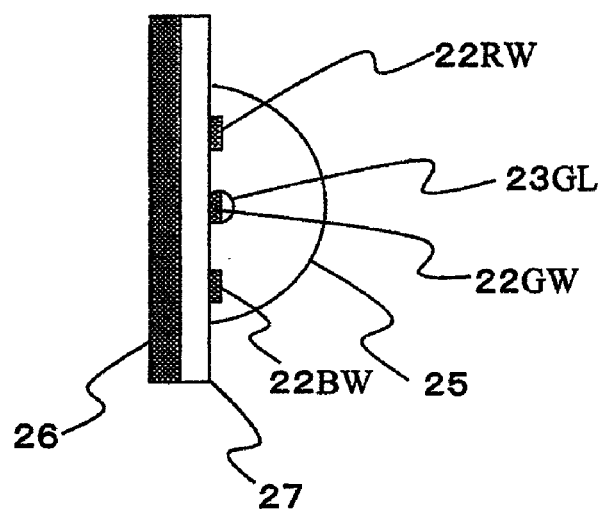
FIG. 4 is a partial schematic cross section of the light source group shown in FIG. 3.

In FIG. 4, the wires and the light emitting devices are formed on the insulation layer 27. For the insulation layer 27, an insulation material consisting of a polymer material can be used, and for example, an epoxy resin, a polyimide resin, and an acrylic resin can be used. Here, in order to make the light outputted from the light emitting device to be reflected efficiently to the light-guiding member side, on the surface of the insulation layer 27 on which the wires and the light emitting devices are formed, a metallic film such as silver and aluminum with high reflection rate, or a reflective coat which realizes the white color reflection by mixing the fine particles which have different refractive index or the voids in the transparent resin, or a reflective surface by dielectric multilayers may be formed.

Also, the light emitting devices are covered with a transparent resin 25. The transparent resin 25 forms a convex lens form or a shell form to make the light outputted from the light emitting device go towards the light-guiding member efficiently. As a transparent resin, a resin transparent for the visible light may be used, and a resin of epoxy system, silicon system, acrylic system, etc. can be used. For example, the transparent resin of silicon system is suitable when the light intensity is large because it is superior in the light resistance and the heat resistance. On the other hand, the transparent resin of epoxy system is inferior to the silicon system in the light resistance and the heat resistance but it has an advantage that it is of the low cost.

At the reverse side of the insulation layer 27, it is preferable to provide a heat sink 26 which consists of a metal which has high thermal conductivity such as aluminum and copper, and carbon and the like as the need arises. This is because generally in the case of LED when the temperature rises the luminous efficiency is lowered. That is, the rise of the temperature of LED is restrained because the heat generated at LED (the light emitting device) is efficiently dispersed and radiated by providing the heat sink 26. Thereby, an effect can be obtained that the lowering of the luminous efficiency by the rise of the temperature of LED is restrained. In order to further enhance this radiation effect, the light source group may be connected to a radiation member such as a radiating fin and the like.

Figure 5:
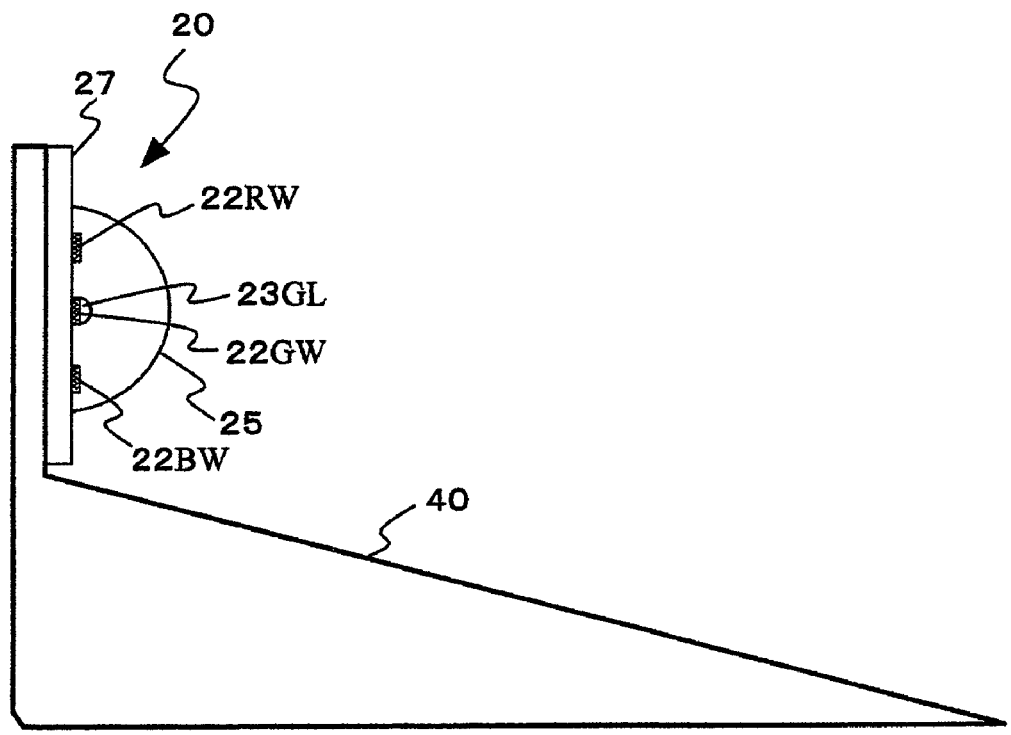
FIG. 5 is a schematic cross section explaining the relationship of the light source group and a radiating member shown in FIG. 1.

FIG. 5 is a schematic cross section explaining the relationship between the light source group and the radiating member. The light source group is configured with the insulation layer 27 and a plurality of wires and light emitting devices formed thereon. This insulation layer 27 is adherently fixed to a radiating member 40 via a heat sink not shown or directly as shown in FIG. 5.

The radiating member 40 is configured with a metal which has high thermal conductivity such as aluminum and copper, and as shown in FIG. 2, it is preferable that it should be provided with a plurality of radiating fins. Here, the form of the radiating fin is not limited to that shown in FIG. 2. For example, the direction of the ditch may be different from that shown in FIG. 2 and it may have a column like configuration. It may be selected the one which can obtain high radiation in the practical use condition.

Also, a lighting unit which has the reverse side almost flat and is of thin type can be realized by making the height of the fin higher in the part near the light source group and making the height of the fin, namely the thickness of the radiating unit thinner as it gets farther from the light source group being adjusted to the form of the light-guiding member 10.

Figure 6:
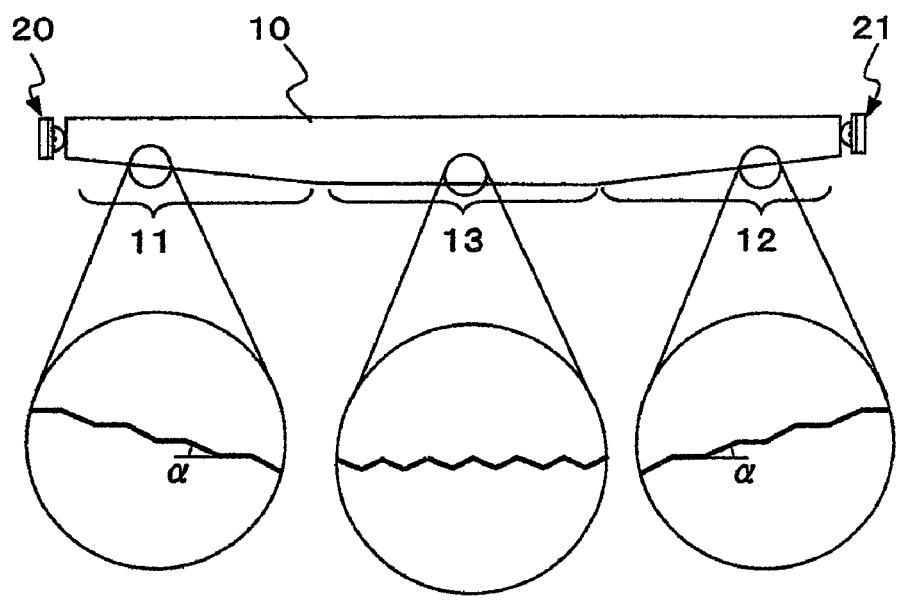
FIG. 6 is a partial enlarged diagram of a light-guiding member shown in FIG. 1.

FIG. 6 is a schematic cross section of the light-guiding member in the lighting unit according to the present invention. The light-guiding member 10 is configured with a board member which is transparent for the visible light and is provided with three areas with different functions. More specifically, the light-guiding member 10 is provided with three areas in order from the terminal surface to which the first light source group is adjacent, a first light mixing area 11, a light outputting area 13, and a second light mixing area 12. Namely, the light-guiding member 10 has the first light mixing area 11 in an area adjacent to the first light source group 20, the second light mixing area 12 in an area adjacent to the second light source group 21, and the light outputting area 13 between the first light mixing area 11 and the second light mixing area 12.

The first light mixing area 11 and the second light mixing area 12 function as a light mixing area for the adjacent light source group and function as a light outputting area for the remote light source group respectively. Here, functioning as a light mixing area means to realize a condition in which the lights which are outputted from the plurality of light emitting devices configuring the light source group and enter in the light-guiding member get mixed each other and they are hardly outputted from the obverse side of the light-guiding member. Also, functioning as a light outputting area means to realize a condition in which the lights which are outputted from the plurality of light emitting devices configuring the light source group and enter in the light-guiding member are outputted from the obverse side of the light-guiding member being light guided in the light-guiding member.

Namely, the first light mixing area 11 is an area where the lights which are outputted from the plurality of light emitting devices configuring the first light source group 20 and enter in the light-guiding member 10 get mixed each other, and on this occasion, it is configured so that the lights from the first light source group 20 are not outputted as possible from the obverse side of the light-guiding member 10 in the first light mixing area 11. Also, the first light mixing area 11 is configured so that the lights which are outputted from the plurality of light emitting devices configuring the second light source group 21 and enter in the light-guiding member 10 are outputted from the obverse side of the light-guiding member 10.

On the other hand, the second light mixing area 12 is configured so that the lights which are outputted from the plurality of light emitting devices configuring the first light source group 20 and enter in the light-guiding member 10 are outputted from the obverse side of the light-guiding member 10, and it is configured so that the lights which are outputted from the plurality of light emitting devices configuring the second light source group 21 and enter in the light-guiding member 10 are not outputted as possible from the obverse side of the light-guiding member 10 and they get mixed each other.

Also, the light outputting area 13 is configured for the lights which are outputted from the first light source group 20 and the second light source group 21 and enter in the light-guiding member 10 as an area to output the lights to the obverse side of the light-guiding member 10. Namely, the light outputting area 13 has a function to output both of the lights from both of the light source groups to the obverse side of the light-guiding member 10.

Namely, the obverse side of the light-guiding member 10 is flat and the first light mixing area 11 and the second light mixing area 12 of the light-guiding member 10 are macroscopically tapered shape which is thin on the light source group side and gets thicker towards the center, and the light outputting area 13 is flat plane. In other words, the light-guiding member 10, assuming the center line which is at the equal distance from two terminal surfaces which face each other to which the two light source groups are adjacent respectively, for this center line its cross section forms become line symmetry to each other.

Namely, the first light mixing area 11 and the second light mixing area 12 is tapered shape which macroscopically gets thicker towards the center line, and the light outputting area 13 is flat plane which continues to the first light mixing area 11 and the second light mixing area 12 continuously.

Here, at the reverse side of the light-guiding member 10, a fine form is formed to output the light which is light guided in the light-guiding member to the obverse side of the light-guiding member. As shown in FIG. 6, in the first light mixing area 11 and the second light mixing area 12 it has a form in which a fine surface which is parallel to the obverse side of the light-guiding member and a fine surface which is tilted by an angle α in the direction in which the light-guiding member gets thicker towards the center of the light-guiding member are alternatively repeated at the reverse side of the light-guiding member. The sizes of these parallel fine surface and tilted fine surface and the angle α of the tilted fine surface may be defined so that a uniform light is outputted and their sizes may be changed depending on their position. It is the practical value that the size of the fine surface is from a few μm to a few tens μm, the angle α is from 1 to 4 degrees. By having such a reverse side form, an area which functions as a light mixing area for the adjacent light source group and functions as a light outputting area for the remote light source group can be realized.

Also, in the light outputting area 13, in order to change the angle of movement of the light which is light guided within the light-guiding member, it is preferable to provide the reverse side of the light-guiding member with many fine uneven surfaces or differences in grade which are tilted for the obverse side of the light-guiding member, or with a form in which fine surfaces which have the reverse directions of the tilt are alternatively repeated as shown in FIG. 6. It is the practical value that the size of this fine surface is from a few μm to a few tens μm, and the angle of the tilt for the obverse side of the light-guiding member is ±1 to 4 degrees. By having such a reverse side form, a function to output both of the lights from both of the light source groups to the obverse side of the light-guiding member can be realized.

Figure 7:
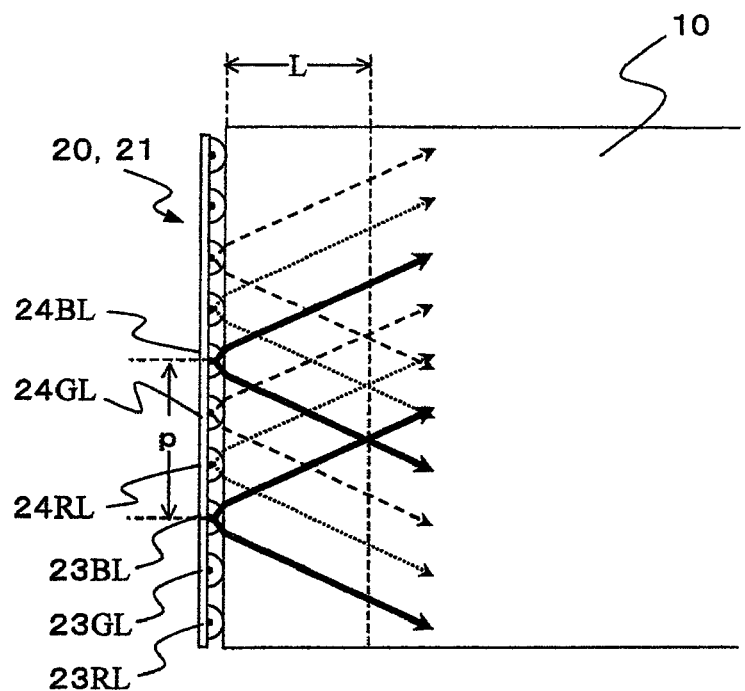
FIG. 7 is a typical diagram to explain a width L of a light mixing area of the light-guiding member shown in FIG. 1.

Next, it will be explained about the size (a width L) of the first and second light mixing areas. FIG. 7 is a typical diagram to explain the width L of the light mixing area. The light mixing area is an area for that the lights which are outputted from the plurality of light emitting devices configuring the light source group 20 or 21 and enter in the light-guiding member 10 get mixed with each other. For this reason, it is preferable to make the width L of the light mixing area from the terminal surface of the light-guiding member 10 as followings.

When the plurality of light emitting devices configuring the light source group are configured with the light emitting devices of different colors such as the red light emitting devices 23RL, 24RL, the green light emitting devices 23GL, 24GL, the blue light emitting devices 23BL, 24BL, and the like as shown in FIG. 7, the pitch of the repetition of the arrangement of the light emitting devices of different colors is supposed to be p. That is, when next to the red light emitting device 23RL, the green light emitting device 23GL, and the blue light emitting device 23BL, again, the red light emitting device 24RL, the green light emitting device 24GL, and the blue light emitting device 24BL are arranged in repetition in order of the same light emitting color, for example, the space between the blue light emitting device 23BL and the blue light emitting device 24BL is supposed to be a pitch p. Further, supposing the half-value angle of the light when it is emitted from the light emitting device and enters in the light-guiding board to be θ1, the angle with which this light enters in the light-guiding member and proceeds within the light-guiding member to be θ2, the refractive index between the light-guiding member and the light emitting device to be n1, and the refractive index of the light-guiding member to be n2, the width L of the light mixing area from the terminal surface of the light-guiding member is preferably no less than the value expressed by the following expression.

$$L = p/2 \tan\theta 2 = p/2 \tan(\sin^{-1}(n1/n2 \cdot \sin\theta 1)) \quad \text{(Expression 1)}$$

This is the least necessary width so that the lights which are emitted from the adjacent light emitting devices of the same light emitting color and have the half strength of the light of the frontal direction are mixed, and the light mixing area is supposed to function with its width no less than this width.

Here, in FIG. 7, it is shown as an example the case in which each one of the light emitting devices of red, green, and blue are arranged repeatedly, but it is not limited to this case. For example, also in the case where each one of blue and red and two of green are arranged repeatedly because with the present LED the efficiency of the green is low, the space of the repetition may be the pitch p. Also, if the plurality of light emitting devices have the same light emitting color, the space between the adjacent light emitting devices may be p.

Here, as a material of the light-guiding member 10, the resin which is transparent for the visible light may be used, and the acrylic resin, the polycarbonate resin, and the amorphous olefin resin which are mainly used for the conventional light-guiding member of edge light type may be used. For example, using COP (cyclo-olefin polymer) which has higher liquidity at molding than the acrylic resin is effective for the improvement of the process yields at molding. Such a resin is commercially available from ZEON corporation with a product name ZEONOR. Also, as COP has the lower moisture permeability than the acrylic, in the case of the light-guiding board which has a large range of change of the thickness as in this embodiment, it has an effective that the occurrence of the curve caused by the moisture permeability can be restrained. Further, as it has a density 20% lower than the acrylic, it has a feature that the weight can be reduced.

Here, in the light mixing area of the light-guiding member, if the surface roughness of the light-guiding member is great, the light which enters in the light-guiding member from the adjacent light source group is diffused when it is light guided in the light-guiding member and is outputted from the obverse side of the light-guiding member and it becomes a cause to lower the uniformity of the illumination light. Here, in the popular chemical component, the surface roughness Ra is required to be no more than 1/10 of the used wavelength. As the used wavelength of the lighting unit according to the present invention is the visible wavelength (about 380~780 nm), as surface roughness Ra it is preferable to be no more than 38 nm.

At the reverse side of the light-guiding member 10, as shown in FIGS. 1 and 2, the light reflector 50 is arranged. The light reflector 50 is the one which makes the light which leaks out to the reverse side of the light-guiding member to be reflected and returned to the light-guiding member side, and it is to use the light effectively. For the light reflector 50, the one in which a reflective surface which has a high reflectance is formed on a support base material of resin board or high polymer film and the like can be used. For the reflective surface, the one in which a metallic film of aluminum, silver and the like which has a high reflectance is formed in film by the vapor-deposition method or the sputtering and the like on the support base material, or the one in which a dielectric multi-layer film is formed on the support base material to improve the reflection, or the one in which the support base material is coated with the white pigment, and the like can be used. Also, the one which is made to function as a reflector by laminating the transparent media which have different refractive indexes in a plurality of layers may be used. More specifically, as light reflector 50, a reflective sheet in which diffusion reflective layers are formed being laminated on the support base material film (product name REFSTAR, Mitsui Chemicals) can be used.

At the obverse side of the light-guiding member 10, as shown in FIGS. 1 and 2, the light control element 30 is arranged to cover it allover. The light control element 30 has a function to unite the directions of movement of the lights which are to be outputted from the light-guiding member 10, and has a function to unite the directions of movement of the lights to the front direction at least in the direction which crosses at right angles with the longitudinal direction of the light source groups 20, 21.

As a unit to realize such a function, a transparent sheet of which both surfaces are configured with a smooth surface and a waveform surface as described in JP-B-1-37801 can be used. Here, as shown in FIGS. 1 and 2, the case where one transparent sheet which is configured in that the surface on the light-guiding member 10 side is a smooth surface and the other surface is a waveform surface is used as light control element 30 will be explained. Such a transparent sheet is commercially available from 3M corporation (USA) with the product names of RBEF, BEFIII, and wave film, and it is appropriate for the light control element in the present invention. As light control element 30, the transparent sheet which has the average pitch of the prism which configures the waveform surface of 50~100 μm and the angle of the prism of 90 degrees is arranged so that the ridgeline (the longitudinal direction) of its prism almost matches the longitudinal direction of the light source groups 20, 21. In other words, on the obverse side of the light-guiding member 10, the transparent sheet of which ridgeline of its prism almost matches the direction of the border line between the first light mixing area 11 and the light outputting area 13 or between the second light mixing area 12 and the light outputting area 13 of the light-guiding member is arranged. Here, a light diffuser not shown may be arranged as the need arises between the light control element 30 and the light-guiding member 10 or on the obverse side of the light control element 30.

The light diffuser arranged between the light control element 30 and the light-guiding member 10 is a unit to improve the uniformity within the surface of the outputted angle distribution and the luminance of the light outputted from the light-guiding member 10. As a light diffuser, the one in which the unevenness is formed on the surface of the transparent high polymer film of PET (polyethylene terephthalate), PC (polycarbonate) and the like, or the one in which a diffused layer in which translucent fine particles of different refractive index from that of the transparent medium are mixed in the transparent medium is formed on the surface of the high polymer film, or the one which has diffusion mixing the voids within the board or the film, or a milky-white member in which the white pigment is dispersed within the transparent member of acrylic resin and the like can be used.

The light diffuser arranged on the obverse side of the light control element 30 is a unit to improve the uniformity within the surface of the outputted angle distribution and the luminance of the light which passed the light control element 30. Also, when the above-mentioned transparent sheet is used as light control element 30, as it is greatly vulnerable for the flaw, the light diffuser also functions as a protection layer of the light control element 30. For such a light diffuser, the one in which the unevenness is formed on the surface of the transparent high polymer film of PET, PC, and the like, or the one in which a diffused layer in which translucent fine particles of different refractive index from that of the transparent medium are mixed in the transparent medium is formed on the surface of the high polymer film, or the one which has diffusion mixing the voids within the board or the film, or a milky-white member in which the white pigment is dispersed within the transparent member of acrylic resin and the like can be used.

Figure 8:
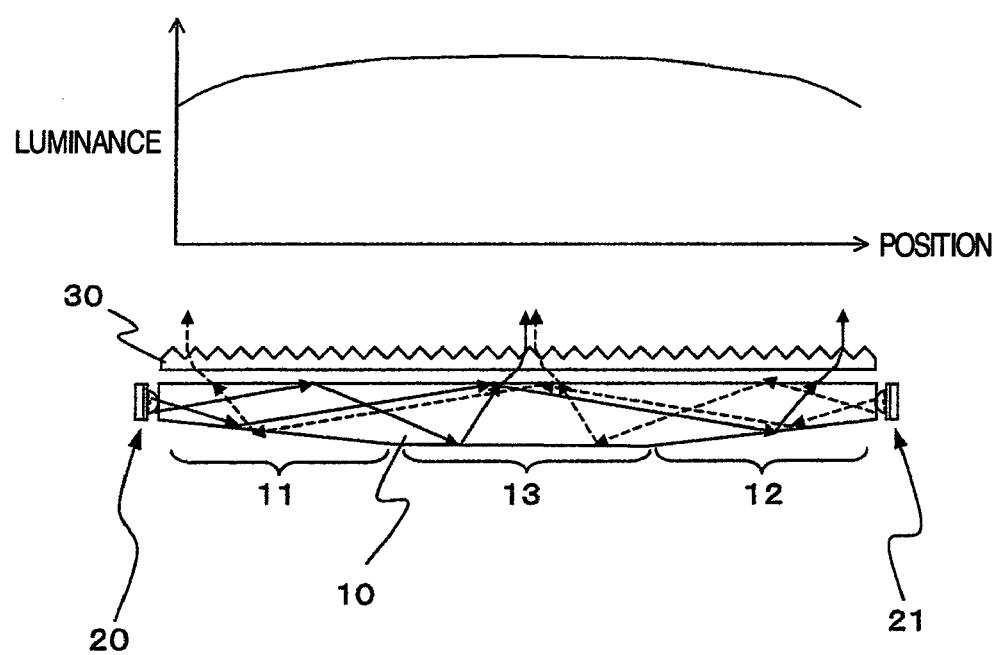
FIG. 8 is an explanation diagram of light path and a luminance distribution diagram of the lighting unit shown in FIG. 1.

Next, the operation of the lighting unit of this embodiment will be explained referring to FIG. 8. FIG. 8 is a schematic configuration diagram showing a partial cross section of the lighting unit according to the present invention and a typical diagram showing the luminance value for the position of the lighting unit.

In FIG. 8, the lights which are outputted from the plurality of light emitting devices configuring the first light source group 20 and enter in the light-guiding member 10 are light guided within the light-guiding member 10 mixing with each other in the first light mixing area 11. On this occasion, as the lights from the first light source group 20 are hardly outputted to the obverse side of the light-guiding member in the first light mixing area 11, it does not occur that the lights which are not mixed are outputted in a large amount. The lights which passed through the first light mixing area 11 proceed within the light-guiding member reflecting between the obverse side of the light-guiding member and the fine surface provided on the reverse side of the light-guiding member in the light outputting area 13, and on this occasion, among the lights which reflected at the tilted fine surface provided at the reverse side of the light-guiding member, the lights which entered with an angle which does not satisfy the condition of the total reflection, that is with the angle no more than the critical angle, to the obverse side of the light-guiding member are outputted from the obverse side of the light-guiding member. On the other hand, the lights which pass through the light outputting area 13 reflect at the tilted fine surface of the reverse side of the light-guiding member and are outputted from the obverse side of the light-guiding board in the second light mixing area 12.

In this way, the lights which were outputted from the first light source group 20 and entered in the light-guiding member 10 are outputted from the light outputting area 13 and the second light mixing area 12 in its majority, and on this occasion, most of the lights are outputted in the direction tilted in the direction which gets farther from the first light source group 20 (in the figure the direction tilted to the right). The lights outputted from the light-guiding member 10 enter in the light control element 30, and on this occasion their directions of movement are changed and they are uniformed in the vertical direction for the obverse side of the light-guiding member. Thereafter, the lights pass through the light diffuser not shown and are outputted from the lighting unit.

On the other hand, the lights which are outputted from the plurality of light emitting devices configuring the second light source group 21 and enter in the light-guiding member 10 are light guided within the light-guiding member 10 mixing with each other in the second light mixing area 12. On this occasion, as the lights from the second light source group 21 are hardly outputted to the obverse side of the light-guiding member in the second light mixing area 12, it does not occur that the lights which are not mixed are outputted in a large amount. The lights which passed through the second light mixing area 12 proceed within the light-guiding member reflecting between the obverse side of the light-guiding member and the fine surface provided on the reverse side of the light-guiding member in the light outputting area 13, and on this occasion, among the lights which reflected at the tilted fine surface provided at the reverse side of the light-guiding member, the lights which entered with an angle which does not satisfy the condition of the total reflection, that is with the angle no more than the critical angle, to the obverse side of the light-guiding member are outputted from the obverse side of the light-guiding member. On the other hand, the lights which pass through the light outputting area 13 reflect at the tilted fine surface of the reverse side of the light-guiding member and are outputted from the obverse side of the light-guiding board in the first light mixing area 11.

In this way, the lights which were outputted from the second light source group 21 and entered in the light-guiding member 10 are outputted from the light outputting area 13 and the first light mixing area 11 in its majority, and on this occasion, most of the lights are outputted in the direction tilted in the direction which gets farther from the second light source group 21 (in the figure the direction tilted to the left). The lights outputted from the light-guiding member 10 enter in the light control element 30, and on this occasion their directions of movement are changed and they are uniformed in the vertical direction for the obverse side of the light-guiding member.

Namely, the lights which are outputted from the first light source group 20 and the second light source group 21 and enter in the light-guiding member 10 have different main directions of movement of the light respectively on the occasion of being outputted from the obverse side of the light-guiding member 10. For this reason, unless the directions of movement of the lights are uniformed, when it is observed from the oblique direction, a problem occurs that the brightness differs depending on its position. In order to solve this problem, the present invention is provided with the light control element 30 as a unit to uniform the lights with different directions of movement in the vertical direction for the obverse side of the light-guiding member.

Also, when the above-mentioned member is used as light control element 30, the luminance of the front (the outputted angle 0 degree) could be improved to about 1.3 times of that in the case where the light control element 30 is not used. That is, in the lighting unit according to the present invention, there is an effect that the luminance unevenness can be prevented and the luminance can be improved when it is observed from the oblique direction by using the light control element 30.

Here, as light control element 30, the transparent sheet which is configured in that the surface on the light-guiding member side is a waveform surface and the other surface is a smooth surface may be used. In this case, as the main directions of movement of the lights outputted from the light-guiding member 10 differ according to the position of the light-guiding member 10, the apex angle of the prism which configures the waveform surface may be changed according to that.

In this way, in the lighting unit according to the present invention, in the first light mixing area 11 and the second light mixing area 12, as the lights which are outputted from the plurality of light emitting devices configuring the adjacent light source group and enter in the light-guiding member are outputted from the light-guiding member in small light intensity while they get mixed with each other, and sufficiently mixed lights are outputted from the light-guiding member, more uniform illumination lights can be obtained.

Figure 9:
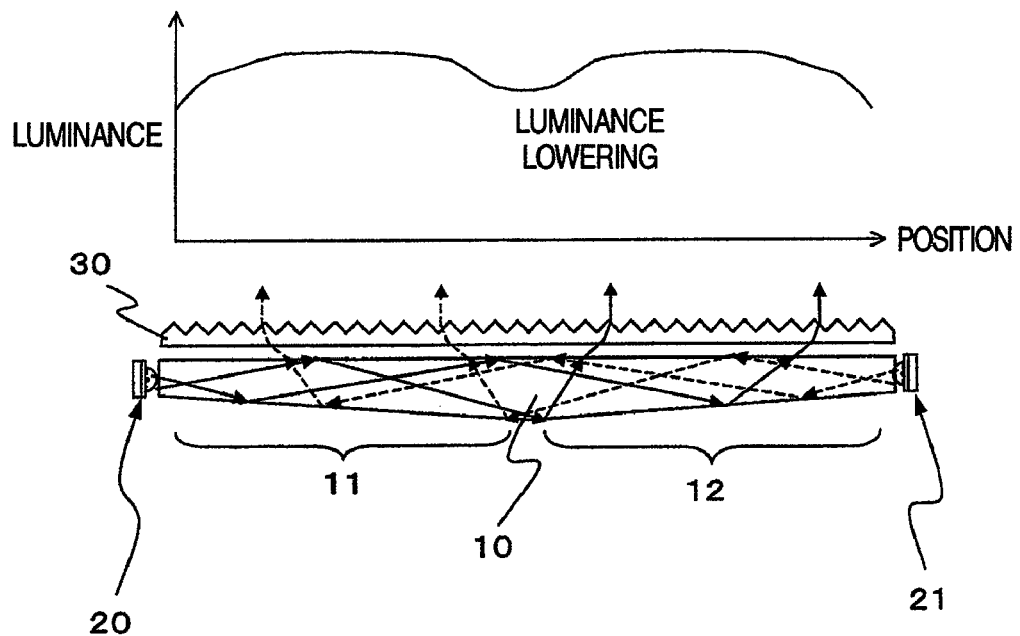
FIG. 9 is an explanation diagram of light path and a luminance distribution diagram when there is no light outputting area in FIG. 8.

Next, it will be explained about the effect of the light outputting area 13 in the lighting unit according to the present invention. FIG. 9 is a schematic configuration diagram showing a partial cross section of the lighting unit and a typical diagram showing the value of the luminance for the position of the lighting unit when there is no light outputting area between the first light mixing area 11 and the second light mixing area 12.

In FIG. 9, when the lights which are outputted from the first light source group 20 and the second light source group 21 and enter in the light-guiding member 10 are outputted from the obverse side of the light-guiding member 10, the main directions of movement of each light differ from each other. That is, the lights from the first light source group 20 have their main directions of movement as the direction tilted to the direction getting farther from the first light source group 20 (in the figure the direction tilted to the right) when they are outputted from the light-guiding member, and the lights from the second light source group 21 have their main directions of movement as the direction tilted to the direction getting farther from the second light source group 21 (in the figure the direction tilted to the left) when they are outputted from the light-guiding member. The directions of movement of the lights which are outputted from the light-guiding member are uniformed by the light control element 30, but as the main directions of movement of the lights outputted from the obverse side of the light-guiding member in the first light mixing area 11 and the lights outputted from the obverse side of the light-guiding member in the second light mixing area 12 are the directions which get farther from each other, a problem occurs that the light intensity becomes insufficient in the central part of the light-guiding member 10 and the luminance is lowered.

In regard to this, in this embodiment, this problem is solved by providing the light outputting area 13 which outputs both of the lights from the first light source group 20 and the second light source group 21 between the first light mixing area 11 and the second light mixing area 12.

In FIG. 8 which has already been explained, more uniform luminance distribution can be obtained compared with the case of FIG. 9 where there is no light outputting area 13.

Further, when there is no light outputting area, it is necessary to widen the first and second light mixing areas. The light mixing area is macroscopically tapered shape in which its thickness gets thicker as it gets farther from the light source groups. For this reason, if the light mixing area gets larger, the thickness of its light-guiding member gets thicker. Therefore, the lighting unit according to the present invention has an effect to realize a lighting unit which has more uniform luminance distribution within the surface and is thinner by providing the light outputting area.

Also, the lighting unit according to the present invention has an effect to realize a lighting unit with small frame because the light mixing area in which the lights from the plurality of light emitting devices are mixed and the light outputting area are used for both purposes. Also, the lighting unit according to the present invention can realize a lighting unit of thin type with its reverse side flat by efficiently arranging the radiating member in the thin part of the light-guiding member as described above. Also, the lighting unit according to the present invention can realize a lighting unit corresponding to the higher luminance and larger area because the light source groups can be arranged on both sides.

Further, when expressing the lighting unit according to the present invention from another point of view, it is as the following. That is, supposing in the light-guiding member in the lighting unit according to the present invention, among the lights which are outputted from the first light source group 20 and enter in the light-guiding member 10, the outputted light intensity per unit area in the surface of the light-guiding member of the lights outputted to the obverse side of the light-guiding member 10 from the first light mixing area 11, the light outputting area 13, and the second light mixing area 12 to be $L011$, $L01$, and $L012$ respectively, and among the lights which are outputted from the second light source group 21 and enter in the light-guiding member 10, the outputted light intensity per unit area in the surface of the light-guiding member of the lights outputted to the obverse side of the light-guiding member 10 from the first light mixing area 11, the light outputting area 13, and the second light mixing area 12 to be $L021$, $L02$, and $L022$ respectively, all the relationships as the followings are satisfied.

$$L011 < L01 < L012$$

$$L021 > L02 > L022$$

$$L011 < L021$$

$$L012 > L022$$

Namely, in the first light mixing area 11 and the second light mixing area 12, the lights which are outputted from the plurality of light emitting devices configuring the adjacent light source group and enter in the light-guiding member are outputted in small light intensity from the light-guiding member before they get mixed with each other, on the other hand, the lights sufficiently mixed are outputted in larger light intensity from the light-guiding member. For this reason, among the lights which are outputted from the plurality of light emitting devices and enter in the light-guiding member, as the lights which are not sufficiently mixed are not outputted as illumination light and the lights which are sufficiently mixed are outputted as illumination light, the illumination light which has high uniformity can be obtained. Therefore, the lighting unit according to the present invention satisfies the relationship as the following.

$$(L011 + L021) \approx (L012 + L022) \leq (L01 + L02)$$

This shows that the light intensities outputted from the first light mixing area 11 and the second light mixing area 12 are almost the same and the light intensity outputted from the light outputting area 13 is equal to or more than the light intensities outputted from the first light mixing area 11 and the second light mixing area 12.

Generally, the intensity of the illumination light is allowed even when it is slightly lower in the peripheral part than in the central part of the lighting unit. That is, in the point of view of using the light effectively, when the total light intensity is the same, it is effective to make the central part slightly brighter than the peripheral part.

In this lighting unit the light outputting area 13 corresponds to the central part of the lighting unit. For this reason, when the light intensity outputted from per unit area of the surface of the light-guiding member in the light outputting area 13 is equal to the light intensity outputted from per unit area of the surface of the light-guiding member in the first light mixing area 11 and the second light mixing area 12, a lighting unit which has high uniformity within the surface of the brightness can be obtained. Also, when the light intensity outputted from per unit area of the surface of the light-guiding member in the light outputting area 13 is slightly larger than the light intensity outputted from per unit area of the surface of the light-guiding member in the first light mixing area 11 and the second light mixing area 12, more specifically when it is larger by about 1~10%, a lighting unit in which the central part is effectively brighter can be obtained.

Embodiment 2

Figure 10:
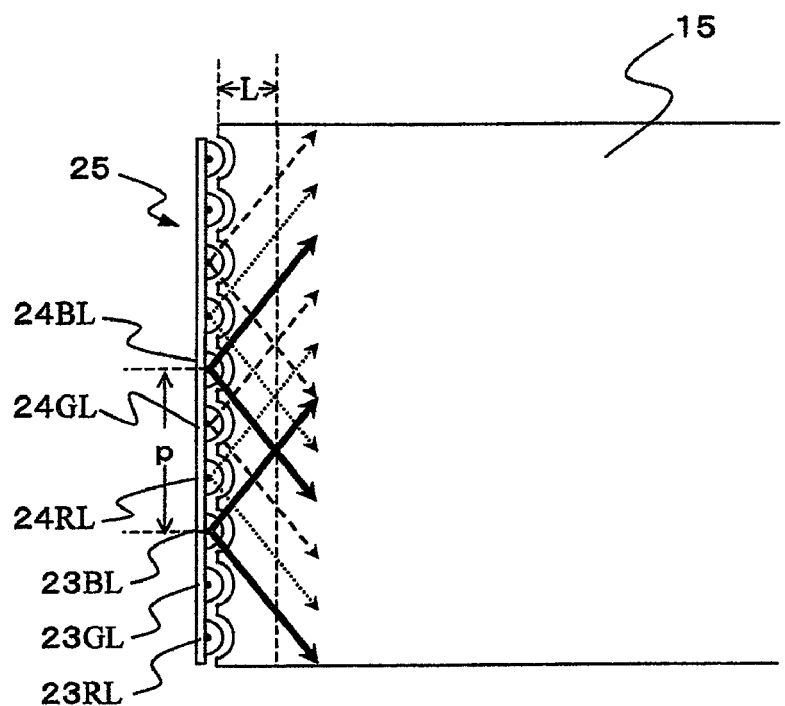
FIG. 10 is another schematic plane diagram of the light-guiding member shown in FIG. 7.

Next, it will be explained about the other embodiment of the light-guiding member in the lighting unit according to the present invention. FIG. 10 is a schematic plane diagram to explain the configuration of the light mixing area of the light-guiding member and its vicinity. This light-guiding member has the form of the terminal surface to which a light source group 25 is adjacent being changed compared with the light-guiding member 10 which has been explained referring to FIG. 7. More specifically, the part to which the plurality of light emitting devices configuring the light source group 25 are adjacent is made to be an arc like hollow.

Namely, in FIG. 10, the lighting unit provided with this light-guiding member 15 has a plurality of arc like hollow parts on the terminal surface of the light-guiding member 15 and arranges one to one the plurality of light emitting devices configuring the light source group in the parts corresponding to their centers. The arc like hollow parts, in order to arrange the plurality of light emitting devices configuring the light source group therein, are made to be larger hollows than the transparent resin which covers the light emitting devices.

Here, as it has been explained referring to FIG. 7, when the terminal surface of the light-guiding member is flat, as the refractive index of the light-guiding member is higher than the refractive index of the space between the light emitting devices and the light-guiding member, namely the air, the light which enters in the terminal surface of the light-guiding member in oblique angle has a small angle according to the Snell's law. That is, the light which is outputted from the light source group and enters in the light-guiding member has narrow angle distribution.

In regard to this, as in this embodiment, when the terminal surface of the light-guiding member, namely an arc like hollow form in which the light enter surface surrounds the light emitting devices is formed, the majority of the lights which are outputted from the light emitting devices and enter in the light-guiding member enters almost vertically to the terminal surface of the light-guiding member. For this reason, the lights outputted from the light emitting devices are not greatly refracted when they enter in the light-guiding member and proceeds within the light-guiding member almost keeping the angle distribution of when they were outputted from the light source group. For this reason, the width L of the light mixing area from the terminal surface of the light-guiding member can be shorter than when the terminal surface of the light-guiding member is flat.

In this case, a thinner lighting unit can be realized by making the width L of the light mixing area smaller. That is, the light mixing area is macroscopically tapered shape in which its thickness gets thicker as it gets farther from the light source groups. For this reason, as the light mixing area becomes shorter, it is possible to make the thickness of the light-guiding member thinner for that. Therefore, the light-guiding member in the lighting unit according to the present invention has an effect to realize a thinner lighting unit by providing arc like hollow parts on its terminal surface, that is, a light entering surface.

Embodiment 3

Figure 11:
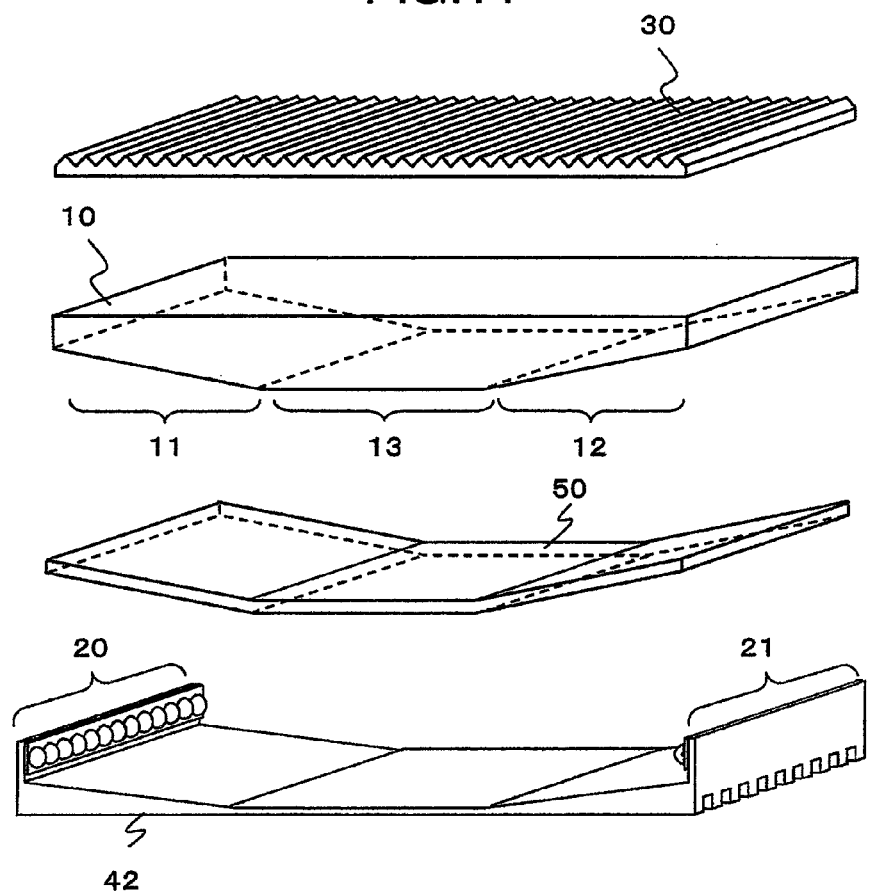
FIG. 11 is another schematic cross-eyed diagram of the radiating member shown in FIG. 2.

Next, it will be explained about the other embodiment of the radiating member in the lighting unit according to the present invention. FIG. 11 is a schematic cross-eyed diagram showing a configuration of the main part of the lighting unit according to the present invention. This embodiment is the lighting unit which has been explained referring to FIG. 2 in which the form of the radiating member connected to the light source group is different, and the explanation will be omitted regarding the parts which have already been explained. In FIG. 2 the radiating members are connected to the two light source groups 20, 21 respectively, but here, one radiating member 42 is connected to the two light source groups 20, 21. On this occasion, in the part corresponding to the reverse side of the light mixing areas 11, 12 of the light-guiding member 10, the height of the radiating fin is secured by making the radiating member thicker as it closes to the light source group and the radiation is improved. On the other hand, in the part corresponding to the reverse side of the light outputting area 13, the radiating member is made to be thin.

In this case, as the reverse side of the lighting unit becomes flat, a lighting unit which is superior in design can be realized. Also, a lighting unit of thin type which has small number of parts can be realized by using the radiating member 42 as a configuration member of the lighting unit, namely as a part of the chassis, for both purposes.

Embodiment 4

Figure 12:
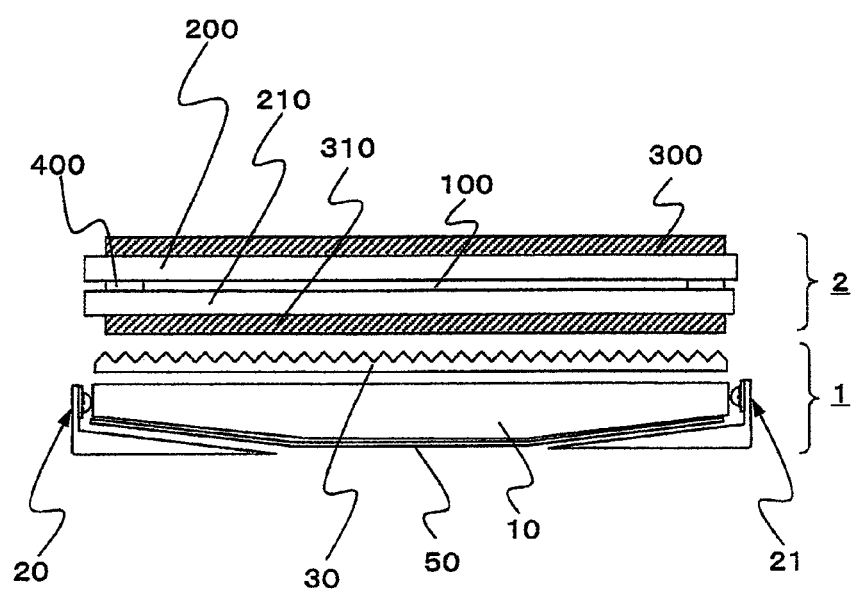
FIG. 12 is a partial cross section showing a schematic configuration of display equipment according to the present invention.

Next, it will be explained about display equipment using the lighting unit according to the present invention. FIG. 12 is a partial cross section showing a schematic configuration of the display equipment according to the present invention. This display equipment is configured with a display panel 2 which displays the image by controlling the transmitted light intensity of the light based on the image information and the lighting unit 1 which illuminates this from the rear. As display panel 2, a display panel which displays the image by adjusting the transmitted light intensity of the entering light can be used, and in particular, a liquid crystal display panel which has a long lifetime and can conduct a matrix display.

For the display panel 2, combining with the lighting unit 1, the liquid crystal display panel of transmissive type or transflective type which displays the image by adjusting the transmitted light intensity of the light from the lighting unit 1 can be used. Here, for the display panel 2 there are the passive drive and the active matrix drive, but as their detailed configurations and operations are well known, their explanations will be omitted here.

As a liquid crystal display panel, the one which is provided with a polarizer and conducts the image display by controlling the state of polarization of the light which enters in the liquid crystal layer is preferable because it can obtain an image with the high contrast ratio at a relatively low driving voltage. For example, as a liquid crystal display panel, TN (Twisted Nematic) type, STN (Super Twisted Nematic) type, ECB (Electrical Controlled Birefringence) type and the like can be used. Also, IPS (In Plane Switching) type and VA (Vertical Aligned) type which are characterized in having a wide viewing angle can be used.

Or, as a liquid crystal display panel a transflective type which applies the above-mentioned type can be used. In this embodiment, it will be explained the summary when the active matrix type is used as a liquid crystal display panel below, but the present invention is not limited to this.

The display panel 2 includes a first transparent substrate 200 and a second transparent substrate 210 which consists of glass or plastic which is flat and transparent and optically isotropic. On the first transparent substrate 200, a color filter and an alignment layer which consists of polyimide system polymer (both are not shown) are laminated. On the second transparent substrate 210, an electrode which forms a plurality of pixels arranged in matrix, a signal line, a scanning line, a switching device which consists of a thin film transistor and the like, and an alignment layer (all of them are not shown) and the like are formed.

The two transparent substrates 200, 210 are arranged with their alignment layer formed surfaces facing each other, and glued in the periphery with a frame shape sealing agent 400 in the condition that they are arranged with a certain space between them by a spacer not shown, and form a space inside. A liquid crystal layer 100 is formed by encapsulating the liquid crystal in this space and sealing it. The liquid crystal layer 100 has its alignment direction of the long axis of its liquid crystal molecules defined by an alignment process which is performed on the alignment layers formed on the two transparent substrates 200, 210.

On the surface on the observant side (the obverse side) of the first transparent substrate 200 and on the surface on the opposite side of the observant side (the reverse side) of the second transparent substrate 210, a first optical film 300 and a second optical film 310 are provided respectively. The first optical film 300 and the second optical film 310 include at least one polarization layer respectively, and they may include an appropriate retarder according to the applied liquid crystal display mode. The polarization layer transmits one of the linearly polarization components which cross at right angles each other and absorbs the other among the lights which enter in this layer.

As a polarization layer, for example, the one which reveals the dichroic absorption by extending a base material film which consists of polyvinyl alcohol on which a dichroism material such as an iodine and an organic dye is dyed or adsorped, etc. and by aligning the dichroism materials is used, and the configuration in which its both sides are put between two transparent protection films which consists of triacetyl cellulose film and the like can be used.

Here, as a film to configure the second optical film 310, it may include a reflective polarizing film which reflects the linearly polarization component which is absorbed at the polarization layer and transmits the light other than this. In this case, the light intensity absorbed at the polarization layer is reduced and a brighter image can be obtained.

The first optical film 300 and the second optical film 310 are fixed to the first transparent substrate 200 and the second transparent substrate 210 via adhesive layers not shown respectively. A two-dimension image is displayed by modulating the transmitted light intensity of the light from the lighting unit 1 within the display area where the first transparent substrate 200 and the second transparent substrate 210 are overlapped. Also, the first optical film 300 and the second optical film 310 both have the area no less than the display area and are arranged to cover the display area allover.

As lighting unit 1, the lighting unit which has been explained so far is used. The display panel 2 is generally has a long sideways display area of an aspect ratio (vertical and horizontal ratio) of 3:4, 4:5, or 9:16, and normally it is established so that the longitudinal direction of the display area matches the horizontal direction. On this occasion, it is preferable that the first light source group 20 and the second light source group 21 configuring the lighting unit 1 are configured so that the longitudinal direction of the arrangement of the plurality of light emitting devices configuring that light source group substantially matches the longitudinal direction of the display area of the display panel 2, that is the horizontal direction, and according to this it is configured so that the longitudinal direction of the ridgeline of the prism configuring the waveform surface of the light control element 30 also substantially matches the horizontal direction of the display area of the display panel 2.

By having such a configuration, the light outputted from the lighting unit 1 becomes the light which is narrowed in the vertical direction of the display area. That is, the vertical direction of the display area becomes narrower in the viewing angle of the luminance than the horizontal direction. Generally, the wider viewing angle is required more in the horizontal direction than in the vertical direction in the display equipment, and this is very effective to distribute the limited lights to the observant efficiently.

The lighting unit configuring this display equipment can realize a lighting unit of narrow frame and thin type, which outputs the illumination light which has a uniform luminance distribution within the screen. Therefore, a high quality image display can be obtained and display equipment of narrow frame and thin type can be realized.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A lighting unit for a display panel comprising a light-guiding member, and, a first light source group and a second light source group in which a plurality of light emitting devices arranged adjacent to each of two terminal surfaces facing each other in said light-guiding member are aligned in a line or in a belt, wherein:

the light-guiding member comprises a first light mixing area adjacent to the first light source group, a second light mixing area adjacent to the second light source group, and a light outputting area between the first light mixing area and the second light mixing area;

in the first light mixing area and the second light mixing area, lights which enter from the plurality of light emitting devices configuring an adjacent light source group are mixed with each other, and lights which enter from a remote light source group and are mixed with each other are outputted to a display panel arranged at an obverse side of the light-guiding member through portions of a surface of the light-guiding member at the obverse side thereof corresponding to the first and second light mixing areas;

in the light outputting area, a part of the lights mixed with each other are transmitted and the rest of the lights are outputted to the display panel through a portion of the surface of the light-guiding member at the obverse side thereof corresponding to the light outputting area;

the light-guiding member is arranged in overlapping relation with the display panel so that both of the first light mixing area and the second light mixing area and the light outputting area thereof are arranged in overlapping relation with the display panel;

a light control element is provided on the obverse side of the light-guiding member;

the light control element is a transparent sheet having many prism surfaces on its surface, and a ridgeline of the prism surfaces is parallel to the arrangement direction (longitudinal direction) of the plurality of light emitting devices;

among the lights which are outputted from the first light source group and enter in the light-guiding member, when assuming outputted light intensity per unit area in the surface of the light-guiding member of the lights which are outputted from the obverse side of the light-guiding member at the first light mixing area, the light outputting area, and the second light mixing area to be L011, L01, L012 respectively, and among the lights which are outputted from the second light source group and enter in the light-guiding member, when assuming outputted light intensity per unit area in the surface of the light-guiding member of the lights which are outputted from the obverse side of the light-guiding member at the first light mixing area, the light outputting area, and the second light mixing area to be L021, L02, L022 respectively, the relationships, $L011<L01<L012,$ $L021>L02>L022,$ $L011<L021,$ and $L012>L022,$ are satisfied.

2. A lighting unit of claim 1, wherein:

the first light mixing area is configured so that the lights which are outputted from the plurality of light emitting devices configuring the first light source group and enter in the light-guiding member are hardly outputted from the obverse side of the light-guiding member and are light guided mixing with each other, and the lights which are outputted from the plurality of light emitting devices configuring the second light source group and enter in the light-guiding member are outputted from the obverse side of the light-guiding member;

the second light mixing area is configured so that the lights which are outputted from the plurality of light emitting devices configuring the second light source group and enter in the light-guiding member are hardly outputted from the obverse side of the light-guiding member and are light guided mixing with each other, and the lights which are outputted from the plurality of light emitting devices configuring the first light source group and enter in the light-guiding member are outputted from the obverse side of the light-guiding member; and the light outputting area is configured so that a part of the lights which are outputted from the plurality of light emitting devices configuring the first light source group and the second light source group pass through being light guided in the light-guiding member and the rest of the lights are outputted from the obverse side of the light-guiding member.

3. A lighting unit of claim 1, wherein:

among the lights which are outputted from the first light source group and enter in the light-guiding member, when assuming outputted light intensity per unit area in the surface of the light-guiding member of the lights which are outputted from the obverse side of the light-guiding member at the first light mixing area, the light outputting area, and the second light mixing area to be L011, L01, L012 respectively, and among the lights which are outputted from the second light source group and enter in the light-guiding member, when assuming outputted light intensity per unit area in the surface of the light-guiding member of the lights which are outputted from the obverse side of the light-guiding member at the first light mixing area, the light outputting area, and the second light mixing area to be L021, L02, L022 respectively, the relationship, $$(L011+L021) \approx (L012+L022) \leq (L01+L02)$$

is satisfied.

4. A lighting unit of claim 1, wherein:

when assuming an arrangement pitch of said plurality of light emitting devices to be p, the half-value angle of the light when it is emitted from the light emitting device and enters in the light-guiding member to be $\theta 1$, the angle with which this light enters in the light-guiding member and proceeds within the light-guiding member to be $\theta 2$, the refractive index between the light-guiding member and the light emitting device to be n1, and the refractive index of the light-guiding member to be n2, a width L from the terminal surface of the light-guiding member in said light mixing area is no less than a value expressed as, $$L = p/2 \tan \theta 2 = p/2 \tan(\sin^{-1}(n1/n2 \cdot \sin \theta 1)).$$

5. A lighting unit of claim 1, wherein in the first light mixing area and the second light mixing area, their surface roughness Ra is no more than 38 nm.

6. A lighting unit of claim 1, wherein:

the first light mixing area and the second light mixing area form a tapered shape in which the thickness of the light-guiding member gets thicker from the terminal surface towards the central direction; and the light outputting area forms a flat plane continuous to the tapered shape.

7. A lighting unit of claim 1, wherein the plurality of light emitting devices are light-emitting diodes of different light emitting colors.

8. A lighting unit of claim 1, which comprises a plurality of arc like hollow parts on the terminal surfaces of the light-guiding member wherein the plurality of light emitting devices configuring the light source groups are arranged corresponding one to one to these hollow parts.

9. A lighting unit of claim 8, wherein the plurality of light emitting devices configuring the light source groups are arranged in the central positions of the arcs forming the hollow parts.

10. A lighting unit of claim 1, wherein both of the first light mixing area and the second light mixing area form a tapered shape in which a thickness of the light-guiding member becomes thicker from a respective terminal surface towards a central direction.

11. A lighting unit for a display panel comprising a light-guiding member, and, a first light source group and a second light source group in which a plurality of light emitting devices arranged adjacent to each of two terminal surfaces facing each other in the light-guiding member are aligned, wherein:

the light-guiding member comprises two tapered shape areas in which their thickness get thicker from their terminal surfaces towards their central directions, and between these tapered shape areas is a flat plane area continuous to these areas;

the light-guiding member which includes the two tapered shape areas and the flat plane area is arranged in overlapping relation to a display panel disposed at an obverse side of the light-guiding member so as to enable the display panel to receive light from the two tapered shape areas and the flat plane area through portions of a surface of the light-guiding member at the obverse side thereof corresponding to the two tapered shape areas and the flat plane area;

the light-guiding member comprises a first light mixing area adjacent to the first light source group, a second light mixing area adjacent to the second light source group, and a light outputting area between the first light mixing area and the second light mixing area;

a light control element is provided on the obverse side of the light-guiding member;

the light control element is a transparent sheet having many prism surfaces on its surface, and a ridgeline of the prism surfaces is parallel to the arrangement direction (longitudinal direction) of the plurality of light emitting devices;

among the lights which are outputted from the first light source group and enter in the light-guiding member when assuming outputted light intensity per unit area in the surface of the light-guiding member of the lights which are outputted from the obverse side of the light-guiding member at the first light mixing area, the light outputting area, and the second light mixing area to be L011, L01, L012 respectively, and among the lights which are outputted from the second light source group and enter in the light-guiding member, when assuming outputted light intensity per unit area in the surface of the light-guiding member of the lights which are outputted from the obverse side of the light-guiding member to the first light mixing area, the light outputting area, and the second light mixing area to be L021, L02, L022 respectively, the relationships, $$L011 < L01 < L012,$$

$$L021 > L02 > L022,$$

$$L011 < L021, \text{ and}$$

$$L012 > L022,$$

are satisfied.

12. A lighting unit of claim 11, wherein said light-guiding member comprises two tapered shape areas which have a cross section form which is symmetry for the central line at the equal distance from its two terminal surfaces and in which its thickness gets thicker towards the central line, and between these tapered shape areas is the flat plane area continuous to these areas.

13. A lighting unit of claim 11, wherein:
in the two tapered shape areas, the lights which enter from the adjacent light source group get mixed with each other without being outputted, and the lights which enter from the remote light source group and get mixed with each other are outputted to the display panel;
in the flat plane area, a part of the lights which get mixed with each other is transmitted and the rest of the lights are outputted to the display panel.

14. A lighting unit of claim 11, wherein a radiating unit to radiate heat which is generated at the light source group is arranged on the reverse side of the tapered shape area.

15. Display equipment comprising a display panel which displays an image by adjusting the transmitted light intensity of light and a lighting unit which illuminates the display panel from the rear, wherein:
the lighting unit comprises a light-guiding member, and, a first light source group and a second light source group in which a plurality of light emitting devices arranged adjacent to each of two terminal surfaces facing each other in the light-guiding member are aligned;
the light-guiding member comprises a first light mixing area adjacent to the first light source group, a second light mixing area adjacent to the second light source group, and a light outputting area between the first light mixing area and the second light mixing area;
in the first light mixing area and the second light mixing area, lights which enter from the plurality of light emitting devices configuring an adjacent light source group are mixed with each other, and lights which enter from a remote light source group and are mixed with each other are outputted to the display panel arranged at an obverse side of the light-guiding member through portions of a surface of the light-guiding member at the obverse side thereof corresponding to the first and second light mixing areas;
in the light outputting area, a part of the lights mixed with each other are transmitted and the rest of the lights are outputted to the display panel through a portion of the surface of the light-guiding member at the obverse side thereof corresponding to the light outputting area;
the light-guiding member is arranged in overlapping relation with the display panel so that both of the first light mixing area and the second light mixing and the light outputting area thereof are arranged in overlapping relation with the display panel;
the long side direction of the display area of the display panel and the arrangement direction (longitudinal direction) of the plurality of light emitting devices are matched;
a light control element is provided on the obverse side of the light-guiding member;
the light control element is a transparent sheet having many prism surfaces on its surface, and a ridgeline of the prism surfaces is parallel to the arrangement direction (longitudinal direction) of the plurality of light emitting devices;
among the lights which are outputted from the first light source group and enter in the light-guiding member, when assuming outputted light intensity per unit area in the surface of the light-guiding member of the lights which are outputted from the obverse side of the light-guiding member at the first light mixing area, the light outputting area, and the second light mixing area to be $L011$, $L01$, $L012$ respectively, and
among the lights which are outputted from the second light source group and enter in the light-guiding member when assuming outputted light intensity per unit area in the surface of the light-guiding member of the lights which are outputted from the obverse side of the light-guiding member at the first light mixing area, the light outputting area, and the second light mixing area to be $L021$, $L02$, $L022$ respectively, the relationships, $$L011<L01<L012,$$

$$L021>L02>L022,$$

$$L011<L021, \text{ and}$$

$$L012>L022,$$

are satisfied.

16. A lighting unit of claim 10, wherein the tapered shape of the first light mixing area and the second light mixing area include one surface forming a portion of a first surface at the obverse side of the light-guiding member which extends substantially in parallel with a surface of the display panel, and another surface forming a part of a second surface at a reverse side of the light-guiding member, the another surface of the tapered shape being tilted with respect to the first surface of the light-guiding member, and the another surface includes a parallel surface portion which is substantially parallel to the first surface of the light-guiding member and a tilted surface portion which is tilted with respect to the parallel surface portion and the first surface of the light-guiding member, the parallel and tilted surface portions of the another surface of the tapered shape being alternately repeated.

17. The lighting unit of claim 14, wherein a thickness of the radiating unit becomes thinner as a part of the radiating unit is farther away from the light source groups.

* * * * *